(12) United States Patent
Zhong

(10) Patent No.: US 7,188,093 B2
(45) Date of Patent: Mar. 6, 2007

(54) METHODS AND SYSTEMS FOR DETERMINING CIRCULAR DEPENDENCY

(75) Inventor: Enci Zhong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 09/968,194

(22) Filed: Oct. 1, 2001

(65) Prior Publication Data

US 2003/0065405 A1   Apr. 3, 2003

(51) Int. Cl.
*G06F 17/00*  (2006.01)

(52) U.S. Cl. ...................................................... 706/55

(58) Field of Classification Search ................... 706/55
See application file for complete search history.

(56) References Cited

U.S. PATENT DOCUMENTS

| | | | |
|---|---|---|---|
| 5,737,518 A | 4/1998 | Grover et al. | 395/183.14 |
| 5,812,849 A | 9/1998 | Nykiel et al. | 395/701 |
| 5,852,818 A * | 12/1998 | Guay et al. | 707/1 |
| 5,856,828 A | 1/1999 | Letcher, Jr. | 345/420 |
| 6,052,709 A * | 4/2000 | Paul | 709/202 |
| 6,115,642 A | 9/2000 | Brown et al. | 700/104 |

* cited by examiner

*Primary Examiner*—Anthony Knight
*Assistant Examiner*—Michael B. Holmes
(74) *Attorney, Agent, or Firm*—Geraldine D. Monteleone, Esq.; David A. Pascarella, Esq.; Heslin Rothenberg Farley & Mesiti P.C.

(57) ABSTRACT

Methods and systems are disclosed for determining whether circular dependency exists in a plurality of dependency rules. The method includes generating for at least some of the plurality of dependency rules a plurality of exclusion lists. Each exclusion list is associated with at least one independent object of a dependency rule and lists as an item a dependent object of the dependency rule. Where an item listed in at least one of the generated exclusion lists corresponds to an independent object having its own exclusion list with at least one item, the at least one item is incorporated into the generated exclusion list. Where at least one of the generated exclusion lists for an independent object includes an item corresponding to the independent object, circular dependency is found. If not, and if all of the dependency rules have been read, circular dependency is not found.

16 Claims, 3 Drawing Sheets

METHODS AND SYSTEMS FOR DETERMINING CIRCULAR DEPENDENCY

TECHNICAL FIELD

This invention relates generally to dependencies. More particularly, the present invention relates to methods and systems for determining circular dependency in a plurality of dependency rules.

BACKGROUND OF THE INVENTION

A concern in the design and verification of systems is dependencies. Dependencies may be static, remaining the same over the life of the system, or they may change over time.

A dependency is a relationship between two items within which a change to one item, the independent object(s) may affect the meaning of the other item, the dependent object. For example, the dependency rule that object A depends on object B, object C, and object D may be illustrated as follows:

A→B C D

A dependent object in one dependency rule may be an independent object in another dependency rule. In addition, it is often not desirable to have circular dependencies in a system. The following three dependency rules, for example, result in a circular dependency:

A→B

B→C

C→A

In particular, if A, B, and C, in the above example, are vehicles in different locations of a road and the dependency refers to the right of way, circular dependency cannot be allowed in order to avoid an accident.

One approach for determining the existence of circular dependency is to manually review the dependency rules. This process is typically time consuming and labor intensive. In addition, as the number of dependency rules increases, it is difficult, if not impossible, to manually check for circular dependency.

Therefore, there is a need for further methods for determining the existence of circular dependency in a plurality of dependency rules.

SUMMARY OF THE INVENTION

The above need is met by the present invention which in one aspect provides a method for use in determining whether circular dependency exists in a plurality of dependency rules. The method includes generating for at least some of the plurality of dependency rules a plurality of exclusion lists. Each exclusion list is associated with at least one independent object of a dependency rule and lists as an item a dependent object of the dependency rule. Where an item listed in one of the generated exclusion lists corresponds to an independent object having its own exclusion list with at least one item, the at least one item is incorporated into the generated exclusion list. A determination is made whether at least one of the generated exclusion lists for an independent object includes an item corresponding to the independent object. Where at least one of the generated exclusion lists for an independent object includes an item corresponding to the independent object, circular dependency is found, if not and if all the dependency rules have been read, circular dependency is not found.

Systems and computer program products corresponding to the above-summarized method is also described and claimed herein.

BRIEF DESCRIPTION OF THE DRAWINGS

The present invention will now be described, by way of example only, with reference to preferred embodiments thereof, as illustrated in the drawings in which.

BEST MODE FOR CARRYING OUT THE INVENTION

The present invention is directed to methods and systems for systematically determining whether circular dependency exists in a plurality of dependency rules. For example, the method may be implemented to determine whether circular dependency exists in a computer program so that steps may be taken to prevent undesirable consequences.

As explained in greater detail below, by providing one or more exclusion lists for one or more of the dependent objects in the dependency rules, it is possible to identify whether circular dependency exists in the dependency rules.

Figure 1:
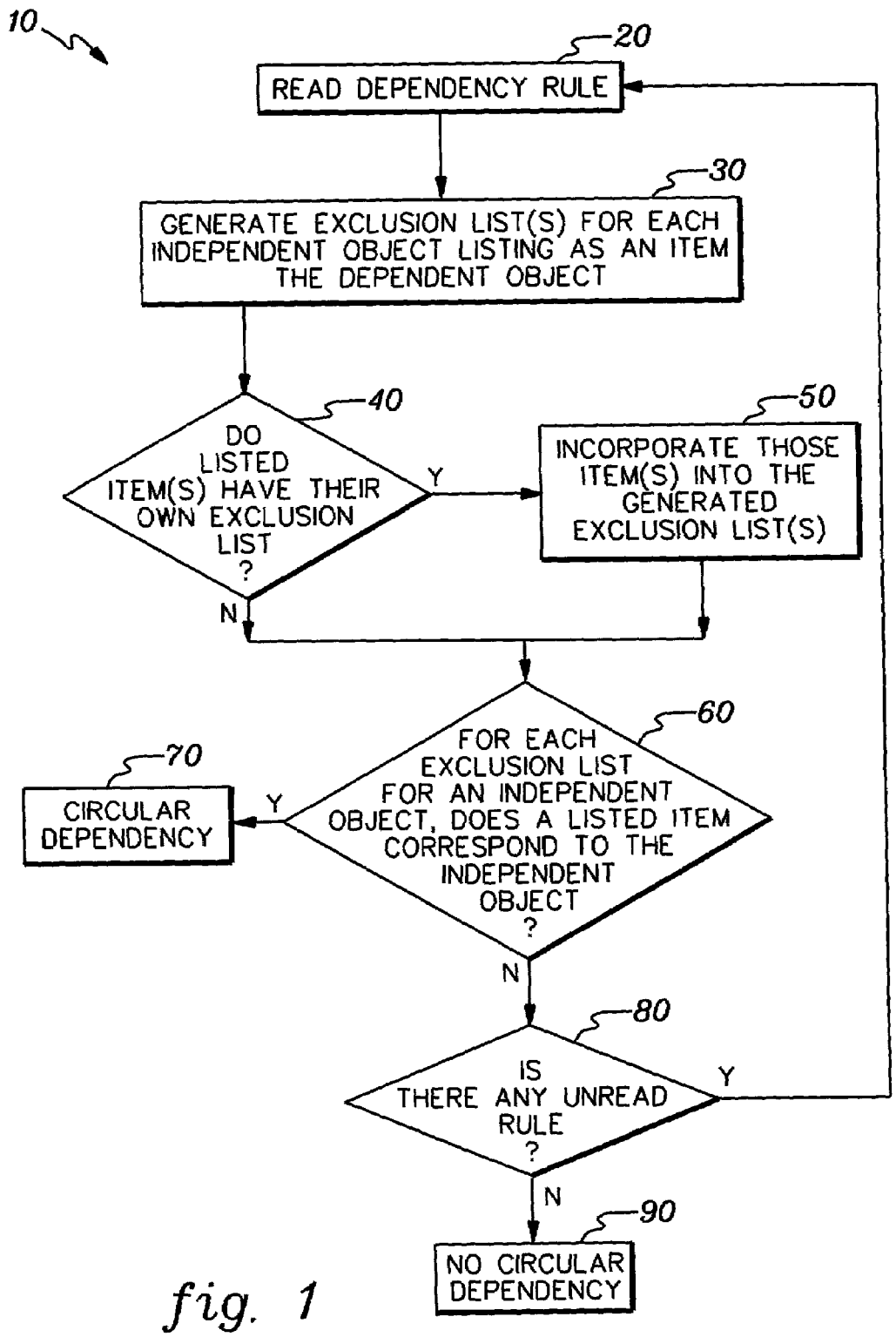
FIG. 1 is a flowchart of one example of a process for determining whether circular object dependency exists in a plurality of dependency rules in accordance with an aspect of the present invention.

FIG. 1 illustrates a flowchart of one example of a process 10 for determining whether circular dependency exists in a plurality of dependency rules. Initially, the various steps of FIG. 1 are described, and thereafter the steps are applied to several examples.

Initially, a first one of a plurality of dependency rules is read or analyzed at 20. At 30, one or more exclusion lists are generated. As described in greater detail below, the generated exclusion lists for each independent object identifies or lists as an item the dependent object. As used herein, the term "generating" is meant to include the creating of separate exclusion lists for each dependency rule and/or extending, expanding, or adding to existing exclusion lists.

At 40, a determination is made whether the listed item(s), e.g., dependent object(s), have their own exclusion lists. If the listed item(s) have their own exclusion list(s), the listed items in those exclusion lists are incorporated in the generated exclusion list(s) at 50. Thereafter, for each generated exclusion list for an independent object, a determination is made as to whether a listed item corresponds to the independent object at 60. If an item corresponds to an independent object, circular dependency is found at 70.

If circular dependency is not found, it is next determined whether there are any unread or unanalyzed dependency rules at 80. If there are one or more unread dependency rules, a next dependency rule is read, at 20, and the process is repeated. That is, further exclusion list(s) are generated (e.g., created or extended) at 30, if the listed item(s) have their own exclusion list(s), the listed items in those exclusion lists are incorporated at 50. Again, at 60, a determination is made as to whether for each generated exclusion list for an independent object a listed item corresponds to the independent object. If an item corresponds to the independent object, circular dependency is found at 70.

If circular dependency is not found, it is determined whether there are any further unread dependency rules at 80. If there are no further unread dependency rules, then at 90, no circular dependency exists for the plurality of dependency rules.

The above-described illustrated process is further understood in connection with the following examples.

EXAMPLE 1

In this example, two dependency rules include, first, object A being dependent on object B, and second, object B being dependent on object A. These two dependency rules may be represented as follows:

A→B

B→A

With reference again to FIG. 1, the first step is to read the first dependency rule, A→B, (at 20) and to create a first exclusion list for independent object B by listing as an item dependent object A (at 30) which may be represented as follows:

B:A

At this point, there is no exclusion list for item A (at 40), nor is independent object B found in the exclusion list for independent object B (at 60). Since a second dependency rule exists and has not been read (at 80), the second dependency rule, B→A, is read (at 20).

A second exclusion list for independent object A is generated by listing as an item dependent object B (at 30), as follows:

A:B

At this point, there is an exclusion list for item B (i.e., B:A above) and item A in the first exclusion list is incorporated into the second exclusion list (at 50), as follows:

A:B A

Item A is found in the exclusion list for independent object A (at 60), and thus, circular dependency is found (at 70).

EXAMPLE 2

In this example, two dependency rules include, first, object A being dependent on object B, and second, object B being dependent on object C, which may be represented as follows:

A→B

B→C

The first dependency rule, A→B is read (at 20), and a first exclusion list for independent object B is generated listing as an item dependent object A (at 30), as follows:

B:A

At this point, there is no exclusion list for item A (at 40), nor is item B found in the exclusion list for independent object B (at 60). Since a second dependency rule exists and has not been read (at 80), second dependency rule, B→C, is read (at 20).

A second exclusion list for independent object C is generated by listing as an item independent object B (at 30), as follows:

C:B

At this point, there is an exclusion list for item B (i.e., B:A above) and item A in the first exclusion list is incorporated into the second exclusion list (at 50), as follows:

C:B A

Item C is not found in the exclusion list for independent object C (at 60). All of the dependency rules have been read (at 80), and thus, circular dependency is not found (at 90).

EXAMPLE 3

In this example, four dependency rules include the following:

A→B C

B→C D

D→E

E→C A

A first exclusion list and second exclusion list for independent objects B and C are generated listing as an item dependent object A as follows:

B:A

C:A

There are no exclusion lists for item A, nor is item B found in the exclusion list for independent object B or item C found in the exclusion list for independent object C. Thus the next dependency rule (B→C D) is read resulting in the following exclusion lists:

C:B

D:B

Since item B has it own exclusion list (i.e., B:A, above), item A is incorporated into the exclusion lists for independent objects C and D as follows:

C:B A

D:B A

Since item C is not found in the exclusion list for independent object C and item D is not found in the exclusion list for independent object D, the next dependency rule (D→E) is read resulting in the following exclusion list:

E:D

The items for the exclusion list for independent object D (i.e., D:B A) are incorporated into the exclusion list for independent object E as follows:

E:D B A

Since item E is not found in the exclusion list for independent object E, the next dependency rule (E→C A) is read resulting in the following exclusion lists:

C:E

A:E

The items for the exclusion list for independent object E (i.e., E:D B A) are incorporated into the exclusion list for object C and A resulting in the following:

C:E D B A

A:E D B A

Since item A is found in the exclusion list for independent object A, circular dependency is found.

EXAMPLE 4

In this example, three dependency rules include the following:

Solomon→David (Solomon is a son of David)

David→Jesse (David is a son of Jesse)

Jesse→Solomon (Jesse is a son of Solomon)

A first exclusion list for the first dependency rule is generated as follows (which means that David cannot be a son of Solomon):

David:Solomon

A second exclusion list for the second dependency rule is generated as follows (which means that Jesse cannot be a son of David):

Jesse:David

At this point, there is an exclusion list for David, and Solomon is incorporated into the second exclusion list as follows (which means that Jesse cannot be a son of David or Solomon):

Jesse:David Solomon

The next dependency rule is read and an exclusion list is generated as follows (which means that Solomon cannot be a son of Jesse):

Solomon:Jesse

Incorporating the items in the exclusion list for Jesse above into the third exclusion list results in the following:

Solomon:Jesse David Solomon

Circular dependency is detected as Solomon is on both sides of the exclusion list. In other words, Solomon cannot be a son of Solomon himself.

EXAMPLE 5

In this example, two dependency rules include the following

A→B Program A will preempt program B (stop program B from running)

B→A Program B will preempt program A (stop program A from running)

A first exclusion list for the first dependency rule is generated as follows:

B:A

A second exclusion list for the second dependency rule is generated as follows:

A:B

There is an exclusion list for independent object B and item A in the first exclusion list is incorporated into the second exclusion list resulting in the following:

A:B A

Item A is found in the exclusion list for independent object A, and thus, circular dependency is found. In particular, this set of dependency rules can stop both programs A and B from running, and if applied, may prevent a computer from operating properly.

Figure 2:
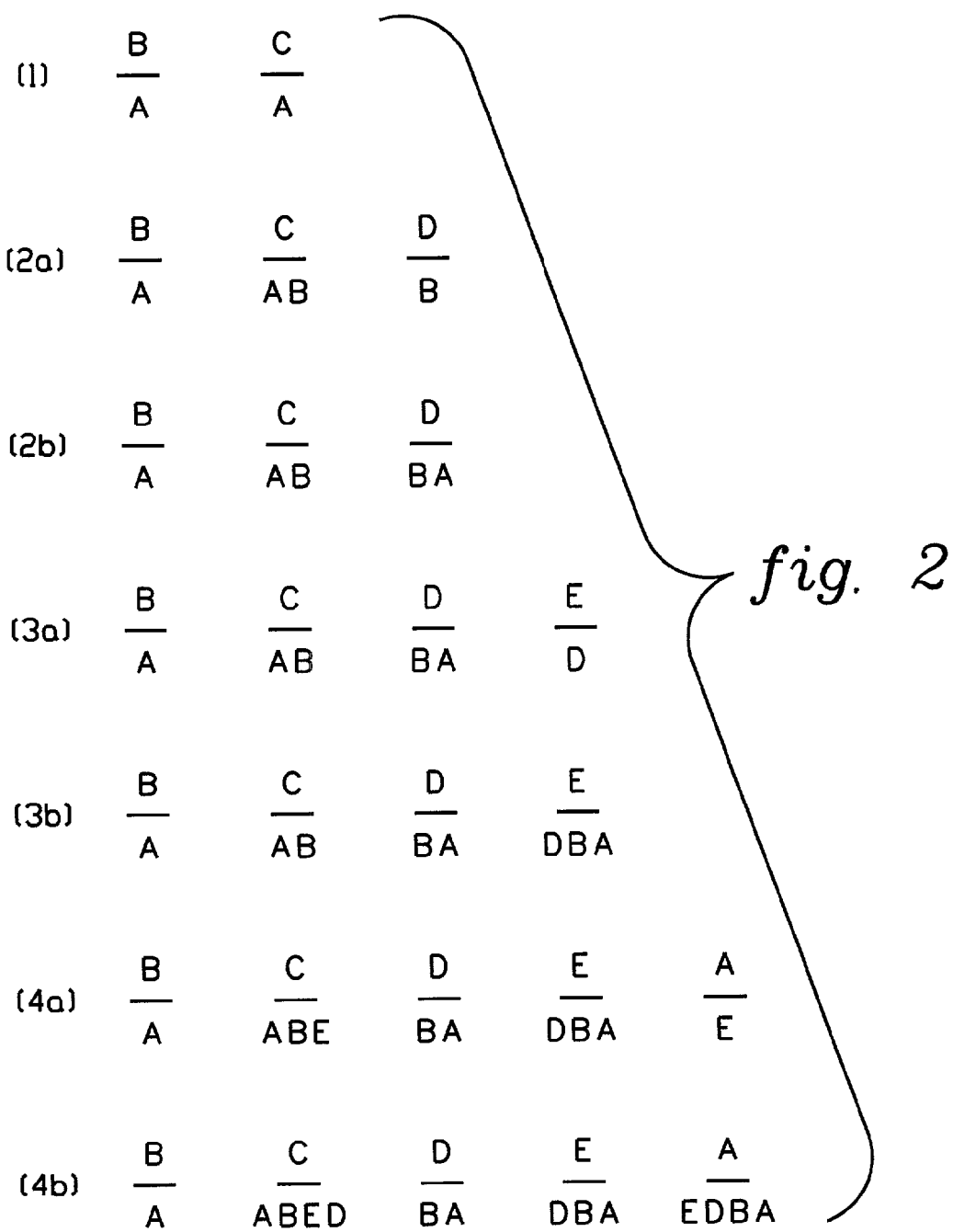
FIG. 2 is an illustration of the results for determining whether circular object dependency exists in a plurality of dependency rules using the process of FIG. 1 in accordance with an aspect of the present invention.

FIG. 2 illustrates the results for representing and determining whether circular dependency exists in a plurality of dependency rules using the process of FIG. 1. FIG. 2 is illustrated in connection with Example 3 above. In particular, in this embodiment, a plurality of exclusion lists for the various independent objects are generated and added to (e.g., extended) upon the review of a subsequent one of a plurality of dependency rules.

For example, from reading the first dependency rule (A→B C), two exclusion lists are generated and listed at (1). Reading the second dependency rule (B→C D), dependent object B is added as an item to the exclusion list for C and an exclusion list for independent object D is generated at (2a). Thereafter, since item B has its own exclusion list (B:A), item A is added to the exclusion list for independent object B at (2b). None of the exclusion lists includes a respective corresponding item.

Reading the third dependency rule (D→E), an exclusion list for E is generated at (3a), and since item D has its own exclusion list (D:B A), items B and A are added to the exclusion list for independent object E at (3b). None of the exclusion lists includes a respective corresponding item. At (4a), the fourth dependency rule (E→C A) is read. Dependent object E is added as an item to the exclusion list for independent object C and an exclusion list for A is generated at (4a). Since item E has its own exclusion list (E:D B A), items D, B, and A are added to the exclusion lists for A and C at (4b).

The exclusion list for independent object A includes item A. Thus, circular dependency is found for this group of four dependency rules.

From the present description, it will be appreciated to those skilled in the art that other ways of illustrating and/or generating exclusion lists or listing the items according the present invention may be equally suitable, e.g., lists, tables, charts, database entries, etc. Accordingly, the term exclusion lists refers to the association of independent objects to various items or dependent objects and is not to be limited to any specific form.

From the present description, it will also be appreciated by those skilled in the art that the present invention may be used to detect circular dependency in a plurality of existing dependency rules, as well as detecting circular dependency when setting up or creating dependency rules.

While the present invention may be implemented manually, the present invention may also be suitably implemented in software, hardware, microcode or any combination thereof to operably review a plurality of dependency rules and determine whether circular dependency is present or review dependency rules as they are created. For a large number of dependency rules, desirably, the processing is automated. Any computing unit, processor, hardware, software, operating system may be suitably employed for carrying out the aspects of the present invention.

Figure 3:
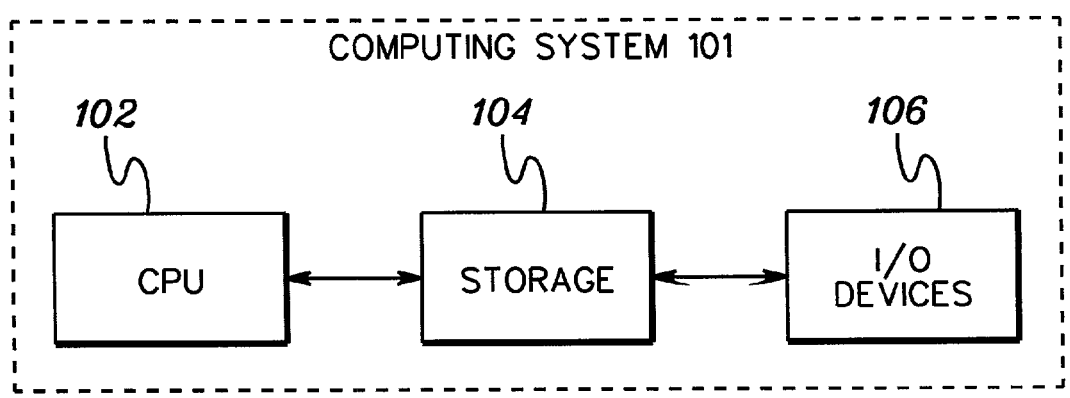
FIG. 3 depicts one example of an overview computing system which can be used to implement an intellectual property management facility in accordance with an aspect of the present invention.

One example of a computing environment incorporating and using an intellectual property management facility in accordance with the present invention is depicted in FIG. 3 and described below.

Referring to FIG. 3, a computer environment 100 includes, for instance, a computing unit 101 having at least one central processing unit 102, a main storage 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit 102 is coupled to main storage 104, which is directly addressable and provides for high speed processing of data by the central processing unit. Main storage may be either physically integrated with the CPU or constructed in stand alone units. The intellectual property database described herein may, in one embodiment, reside within main storage 104.

Main storage 104 is also coupled to one or more local or remote input/output devices 106. These devices include, for instance, keyboards, communications controllers, teleprocessing devices, printers, magnetic storage media (e.g., tape, disks), direct access storage devices, and sensor based equipment. Data is transferred from main storage 104 to input/output devices 106, and from the input/output devices back to main storage.

In one example, computer environment 100 can be a single system environment, which includes an RS/6000 computer system running an AIX operating system. (RS/6000 and AIX are offered by International Business Machines Corporation). The invention is not limited to such an environment, however. The capabilities of the present invention can be incorporated and used within many types of computer environments and many types of computer systems. For instance, computer environment 100 can include a UNIX workstation running a UNIX-based operating system. Other variations are also possible and are considered a part of the claimed invention.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer-implemented method for use in determining whether circular dependency exists in a plurality of computer-implemented dependency rules of at least one computer program, the method comprising:

generating and storing for at least some of the plurality of dependency rules a plurality of exclusion lists, each exclusion list being associated with at least one independent object of a dependency rule and listing as an item a dependent object of the dependency rule;

where an item listed in one of the generated and stored exclusion lists corresponds to an independent object having its own exclusion list with at least one item, incorporating and storing the at least one item into the generated and stored exclusion list;

determining whether at least one of the generated and stored exclusion lists for an independent object includes an item corresponding to the independent object;

identifying circular dependency where at least one generated and stored exclusion list for an independent object includes an item corresponding to the independent object; and preventing an undesirable consequence of the circular dependency in the at least one computer program in response to identifying the circular dependency having the at least one generated and stored exclusion list for the independent object.

2. The computer-implemented method of claim 1 further comprising determining whether at least one exclusion list has been generated and stored for each of the plurality of dependency rules.

3. The computer-implemented method of claim 2 further comprising identifying that circular dependency does not exist where each of the generated and stored exclusion lists do not include an item corresponding to the independent object.

4. The computer-implemented method of claim 1 wherein the generating and storing a plurality of exclusion lists comprises:

reading a first one of the plurality of dependency rules;

generating and storing an exclusion list for each of the at least one independent object of the first one of the plurality of dependency rules, each exclusion list listing as an item the dependent object in the first one of the plurality of dependency rules;

reading a second one of the plurality of dependency rules; and generating and storing an exclusion list for each of the at least one independent object of the second one of the plurality of dependency rules, each exclusion list listing as an item the dependent object in the second one of the plurality of dependency rules.

5. The computer-implemented method of claim 4 further comprising subsequently generating and storing an exclusion list for each one of the at least one independent object of a subsequent one of the plurality of dependency rules, each of the at least one subsequent exclusion list listing as an item the dependent object, and repeating the steps of incorporating and determining.

6. A computer-implemented system for use in determining whether circular dependency exists in a plurality of computer-implemented dependency rules of at least one computer program, the system comprising:
- means for generating and storing for at least some of the plurality of dependency rules a plurality of exclusion lists, each exclusion list being associated with at least one independent object of a dependency rule and listing as an item a dependent object of the dependency rule;
- means for incorporating and storing, where an item listed in one of the generated and stored exclusion lists corresponds to an independent object having its own exclusion list with at least one item, the at least one item into the generated and stored exclusion list;
- means for determining whether at least one of the generated and stored exclusion lists for an independent object includes an item corresponding to the independent object;
- means for identifying circular dependency where at least one generated and stored exclusion list for an independent object includes an item corresponding to the independent object; and
- means for preventing an undesirable consequence of the circular dependency in the at least one computer program in response to identifying the circular dependency having the at least one generated and stored exclusion list for the independent object.

7. The computer-implemented system of claim 6 further comprising means for determining whether at least one exclusion list has been generated and stored for each of the plurality of dependency rules.

8. The computer-implemented system of claim 7 further comprising means for identifying that circular dependency does not exist where each of the generated and stored exclusion lists do not include an item corresponding to the independent object.

9. The computer-implemented system of claim 6 wherein the means for generating a plurality of exclusion lists comprises:
- means for reading a first one of the plurality of dependency rules;
- means for generating and storing an exclusion list for each of the at least one independent object of the first one of the plurality of dependency rules, each exclusion list listing as an item the dependent object in the first one of the plurality of dependency rules;
- means for reading a second one of the plurality of dependency rules; and
- means for generating and storing an exclusion list for each of the at least one independent object of the second one of the plurality of dependency rules, each exclusion list listing as an item the dependent object in the second one of the plurality of dependency rules.

10. The computer-implemented system of claim 9 further comprising means for subsequently generating and storing an exclusion list for each one of the at least one independent object of a subsequent one of the plurality of dependency rules, each of the at least one subsequent exclusion list listing as an item the dependent object, and repeating the steps of incorporating and determining.

11. A computer-implemented system for use in determining whether circular dependency exists in a plurality of computer-implemented dependency rules of at least one computer program, the system comprising:
- a computing unit adapted to generate and store for at least some of the plurality of dependency rules a plurality of exclusion lists, each exclusion list being associated with at least one independent object of a dependency rule and listing as an item a dependent object of the dependency rule;
- the computing unit adapted to incorporate and store, where an item listed in one of the generated exclusion lists corresponds to an independent object having its own exclusion list with at least one item, the at least one item into the generated exclusion list;
- the computing unit adapted to determine whether at least one of the generated and stored exclusion lists for an independent object includes an item corresponding to the independent object;
- the computing unit adapted to identify circular dependency where at least one generated and stored exclusion list for an independent object includes an item corresponding to the independent object; and
- the computing unit adapted to prevent an undesirable consequence of the circular dependency in the at least one computer program in response to identifying the circular dependency having the at least one generated and stored exclusion list for the independent object.

12. At least one program storage device readable by a machine, tangibly embodying at least one program of instructions executable by the machine to perform a method for use in determining whether circular dependency exists in a plurality of computer-implemented dependency rules of at least one computer program, the method comprising:
- generating and storing for at least some of the plurality of dependency rules a plurality of exclusion lists, each exclusion list being associated with at least one independent object of a dependency rule and listing as an item a dependent object of the dependency rule;
- where an item listed in one of the generated and stored exclusion lists corresponds to an independent object having its own exclusion list with at least one item, incorporating and storing the at least one item into the generated exclusion list;
- determining whether at least one of the generated and stored exclusion lists for an independent object includes an item corresponding to the independent object;
- identifying circular dependency where at least one generated and stored exclusion list for an independent object includes an item corresponding to the independent object; and
- preventing an undesirable consequence of the circular dependency in the at least one computer program in response to identifying the circular dependency having the at least one generated and stored exclusion list for the independent object.

13. The at least one program storage device of claim 12 wherein the method further comprises determining whether at least one exclusion list has been generated and stored for each of the plurality of dependency rules.

14. The at least one program storage device of claim 13 wherein the method further comprises identifying that circular dependency does not exist where each of the generated and stored exclusion lists do not include an item corresponding to the independent object.

15. The at least one program storage device of claim 12 wherein the generating a plurality of exclusion lists comprises:
- reading a first one of the plurality of dependency rules;
- generating and storing an exclusion list for each of the at least one independent object of the first one of the plurality of dependency rules, each exclusion list listing as an item the dependent object in the first one of the plurality of dependency rules;

reading a second one of the plurality of dependency rules; and generating and storing an exclusion list for each of the at least one independent object of the second one of the plurality of dependency rules, each exclusion list listing as an item the dependent object in the second one of the plurality of dependency rules.

16. The at least one program storage device of claim 12 wherein the method further comprises subsequently generating and storing an exclusion list for each one of the at least one independent object of a subsequent one of the plurality of dependency rules, each of the at least one subsequent exclusion list listing as an item the dependent object, and repeating steps incorporating and generating.

\* \* \* \* \*